Patented Jan. 16, 1951

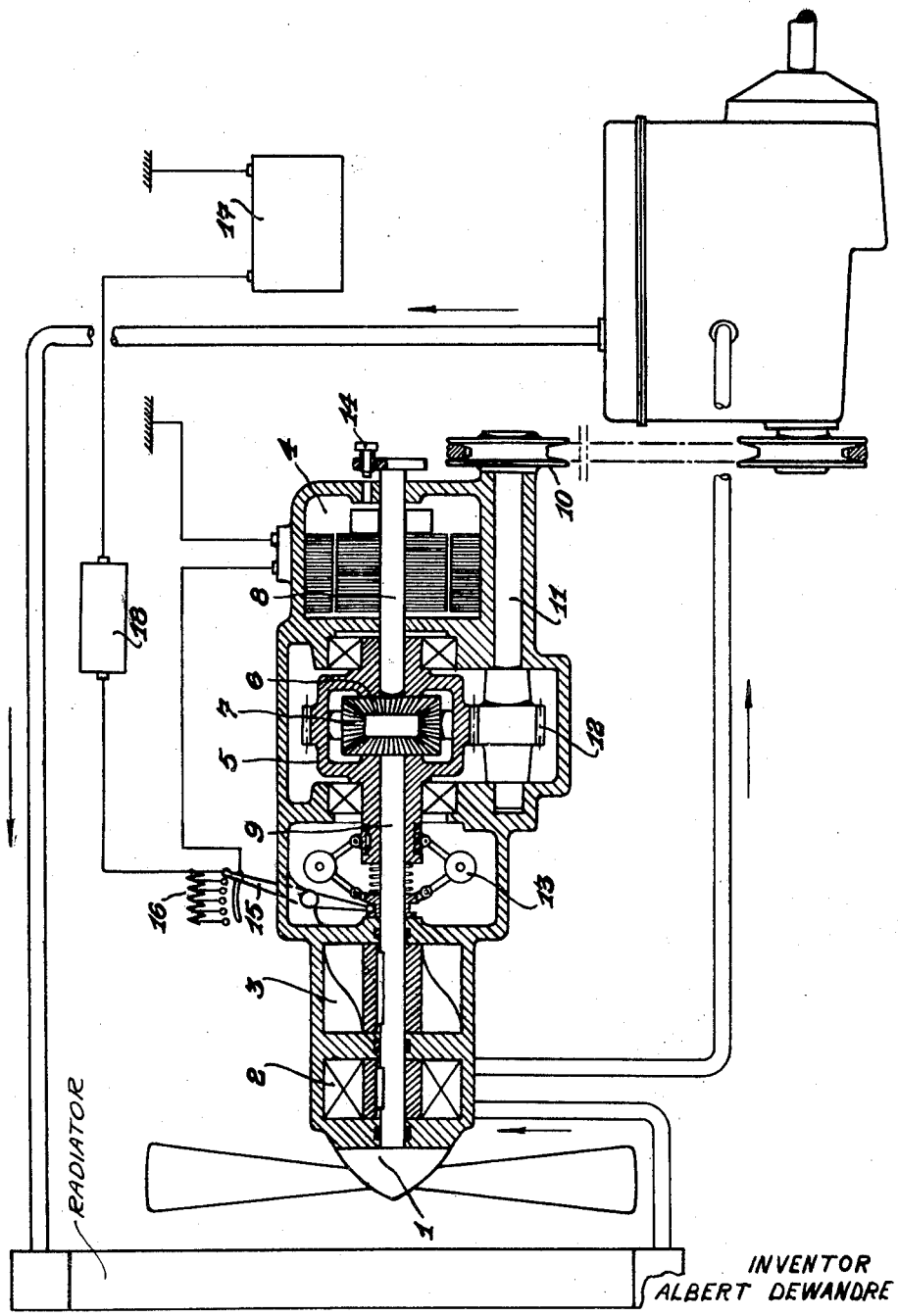

2,538,299

UNITED STATES PATENT OFFICE 2,538,299

MOTOR PUMP AND FAN SET FOR AUTOMOBILE VEHICLES

Albert Dewandre, Brussels, Belgium, assignor to Servo-Frein Dewandre, Societe Anonyme, Liege, Belgium Application June 1, 1948, Serial No. 30,250
In Belgium October 11, 1947

6 Claims. (Cl. 123—41.46)

The present invention relates to an arrangement which makes it possible to rotate at constant speed the various accessories, such as pumps and fan, of the internal combustion engine of an automobile vehicle, whatever the speed of the engine may be.

In such vehicles the work effected by certain accessories of the engine, such as the water pump and the fan, is sometimes insufficient at a slow speed of the engine, whilst at a high speed it is generally more than enough when these accessories are actuated in the usual manner, that is, in proportion to the speed of the engine. The same holds good for any other member receiving its drive in the same manner, for example an oil pump for actuating a servo-brake or servomotor steering gear. It would thus be preferable in most cases to drive these accessories or members at a constant speed, which would allow a more accurate pre-determination of their characteristics.

This constant-speed drive could obviously be effected by means of an electric motor supplied by the battery of the vehicle, but such a drive would require a battery and a recharging dynamo of sufficient capacity to furnish the power required.

The purpose of the present invention is to remedy this inconvenience by providing an electro-mechanical arrangement making it possible to drive the various pumps, the fan or other accessories at a constant speed whatever the speed of the motor of the vehicle may be, the working of this arrangement only requiring a fraction of the power of the battery of the vehicle, the rest of the power being supplied by the combustion engine.

According to the invention, the arrangement comprises a differential, the crown wheel of which is actuated by the motor of the vehicle, the shaft of one of the bevel wheels of the said differential being connected to an electric motor supplied with current by the accumulator battery of the vehicle, whilst the shaft of the other bevel wheel of the differential controls the pumps, the fan and the other accessories that are to be driven at a constant speed.

In accordance with a further feature of the invention, the arrangement is provided with a regulator automatically adjusting the speed of the said electric motor, and also with a manually operated locking arrangement intended to block this motor in case of a break-down of the accumulator battery of the vehicle.

By way of example only, one form of construction of the invention will now be described with reference to the accompanying drawing, which shows the apparatus in axial sectional elevation.

As shown in this drawing, the set comprises, in alignment with one another, a fan 1 and a water pump 2 serving for cooling the main engine of the vehicle, and also all the other accessories which it is considered advantageous to operate at a constant speed, for example: an oil pump 3 for actuating a servo-brake and servomotor steering gear, a lighting and recharging dynamo, and so forth. On the same line is also situated an electric motor 4 for driving the set, supplied with current by an accumulator 17, and also a differential, comprising a casing with an actuating crown wheel 5, differential bevel wheels 6, differential pinions 7, and two shafts 8 and 9, of which the first shaft 8 is driven by the electric motor 4, whilst the second shaft 9 drives the pumps 2 and 3 and the fan 1. This differential may however be of quite a different type from that represented, for example with spur toothed pinions or with different planet wheels. The casing 5 of the differential receives its motion from the main engine of the vehicle through a pulley 10, a shaft 11 and a pinion 12 meshing with the crown wheel 5, or by any other similar drive.

A governor 13 is provided to regulate in a suitable manner the speed of the motor 4, and it may be mounted at the end of the casing 5 of the differential, as shown, or on the shaft 11. This governor may for example act on the lever 15 of a rheostat 16 interposed in the supply circuit of the motor 4. In the said circuit, a starter 18 is also provided, intended for starting the motor 4. A hand-operated arrangement 14 is also provided for blocking the motor 4, so as to be able to operate in case of a break-down of the battery. This arrangement 14 is constituted by a screw-threaded pin which can be engaged in a corresponding hole formed in the casing of the motor 4.

This arrangement operates as follows:

When the engine of the vehicle, and consequently the pinion 12 of the set, are rotating at a high speed, the motor 4 turns at a slow speed to give the required complement of speed; the torque on the pinions 6 has a certain value, which, multiplied by the speed of the motor 4, gives the power to be furnished by this motor. This power is therefore much less than that required by the various accessories.

When the motor of the vehicle, and consequently the pinion 12 of the set, rotate at a slow speed, the motor 4 turns at a high speed to give the required complement of speed; and the torque on the pinions 6 has the same value as before. The power to be furnished by the motor 4 will be greater than that envisaged in the previous paragraph, but will still remain less than the total power required.

The governor 13 continually adjusts the speed of the motor 4 as a function of the speed of the casing 5 of the differential, and therefore of the engine of the vehicle.

It is also possible to turn the pumps and the fan at their normal speed even when the motor of the vehicle is stopped. In this exceptional case only, the motor 4 has to turn at the working speed, and thus the motor and the battery have to furnish the whole of the power required. Finally, in the event of failure of the battery, it is sufficient to block the motor 4' by means of the arrangement 14 in order to effect the actuation of the pumps and fan by the engine of the vehicle alone.

What I claim is:

1. An arrangement for driving at a constant speed, accessories, such as pumps and fan, associated with an internal combustion engine, which comprises in combination, a first shaft, at least one accessory comprising an element rotatably connected to said shaft, a second shaft, electric motor means drivingly connected to said second shaft, a differential gear system drivingly interconnecting said first and second shaft, an electric power source arranged to supply current to said motor means, an internal combustion engine, transmission means drivingly interconnecting said engine with said differential gear system, first control means associated with said power source and operable to vary the current supplied to said motor means, and second control means operatively connected with said engine and operable automatically to adjust said first control means in conformity with variations in the speed of said engine.

2. An arrangement for driving, at a constant speed, accessories such as pumps and fan of the combustion engine of an automotive vehicle, comprising: a differential, a casing for said differential, a crown wheel supported by said casing, a transmission shaft actuated by said combustion engine, a pinion on said shaft engaging said crown wheel, two planet wheels in said differential, a shaft on each of said planet wheels, rotative accessories of said combustion engine driven by one of said shafts an electric motor for driving the other of said shafts, a battery of accumulators for supplying current to said electric motor, regulator means depending from the speed of the said combustion engine, to adjust the speed of said electric motor, and manually controlled means to immobilise the shaft and said electric motor in case of break-down of said battery.

3. An arrangement for driving, at a constant speed, accessories such as pumps and fan of the combustion engine of an automotive vehicle, comprising: a differential, a casing of said differential, crown wheel supported by said casing, a transmission shaft actuated by said combustion engine, a pinion on said shaft engaging said crown wheel, two planet wheels in said differential, a shaft on each of said planet wheels, rotative accessories of said combustion engine driven by one of said shafts, an electric motor for driving the other of said shafts, a battery of accumulators for supplying current to said electric motor, a governor actuated by the casing of said differential, means actuated by said governor for adjusting the speed of said electric motor, and manually controlled means to immobilise the shaft of said electric motor in case of breakdown of said battery.

4. An arrangement for driving, at a constant speed, accessories such as pumps and fan of the combustion engine of an automotive vehicle, comprising: a differential, a casing for said differential, a crown wheel supported by said casing, a transmission shaft actuated by said combustion engine, a pinion on said shaft engaging said crown wheel, two planet wheels in said differential, a shaft on each of said planet wheels, rotative accessories of said combustion engine driven by one of said shafts, an electric motor for driving the other of said shafts, a battery of accumulators for supplying current to said electric motor, a governor actuated by the casing of said differential, a rheostat and a starter interposed in the circuit of said battery of accumulators to said electric motor, a sliding contact for controlling said rheostat, means provided on said governor to actuate said sliding contact so as to adjust the speed of said electric motor with respect to the speed of the combustion of the engine, and manually controlled means to immobilise the shaft of said electric motor, in case of a break-down of said battery of accumulators.

5. An arrangement for driving, at a constant speed, accessories such as pumps, and fan of the combustion engine of an automotive vehicle comprising: a differential, a transmission for actuating said differential by said combustion engine, two planet wheels in said differential, a shaft on each of said planet wheels, a water pump, an oil pump and a fan for said combustion engine driven by one of said shafts, an electric motor for driving the other of said shafts, a battery of accumulators for supplying current to said electric motor, means to automatically control the speed of said electric motor with respect to the speed of said combustion engine, a protection casing for said arrangement, a bore, in said casing, in which passes the end of the shaft driven by said electric motor, a crank disc fixed at the end of said last shaft, a screw-threaded pin in said crank disc and a corresponding hole in said protection casing to be engaged by said pin, in case of a break-down of said battery of accumulators.

6. An arrangement for driving at a constant speed, accessories, such as pumps and fan, associated with an internal combustion engine, which comprises in combination, a first shaft, at least one accessory comprising an element rotatably connected to said shaft, a second shaft, electric motor means drivingly connected to said second shaft, a differential gear system drivingly interconnecting said first and second shaft, an electric power source arranged to supply current to said motor means, an internal combustion engine, transmission means drivingly interconnecting said engine with said differential gear system, first control means associated with said power source and operable to vary the current supplied to said motor means, second control means operatively connected with said engine and operable automatically to adjust said first control means in conformity with variations in the speed of said engine, and manually operable means associated with said electric motor means and operable to immobilize said second shaft.

ALBERT DEWANDRE.

(References on following page)

REFERENCES CITED

The following references are of record in the file of this patent:

UNITED STATES PATENTS

| Number | Name | Date |
|---|---|---|
| 1,167,509 | MacDonald | Jan. 11, 1916 |
| 1,861,809 | McCaleb | June 7, 1932 |
| 1,896,852 | Schaer | Feb. 7, 1933 |
| 1,900,586 | Rippe | Mar. 7, 1933 |

FOREIGN PATENTS

| Number | Country | Date |
|---|---|---|
| 581,848 | France | of 1924 |